(12) United States Patent
Finkelstein

(10) Patent No.: US 12,768,993 B2
(45) Date of Patent: Oct. 20, 2026

(54) SEGMENTED FLASH LIDAR USING STATIONARY REFLECTORS

(71) Applicant: Sense Photonics, Inc., Durham, NC (US)

(72) Inventor: Hod Finkelstein, Berkeley, CA (US)

(73) Assignee: Sense Photonics, Inc., Durham, NC (US)

(*) Notice: Subject to any disclaimer, the term of this patent is extended or adjusted under 35 U.S.C. 154(b) by 798 days.

(21) Appl. No.: 18/249,312

(22) PCT Filed: Oct. 21, 2021

(86) PCT No.: PCT/US2021/055981
§ 371 (c)(1),
(2) Date: Apr. 17, 2023

(87) PCT Pub. No.: WO2022/087222
PCT Pub. Date: Apr. 28, 2022

(65) Prior Publication Data

US 2023/0408694 A1 Dec. 21, 2023

Related U.S. Application Data

(60) Provisional application No. 63/104,155, filed on Oct. 22, 2020.

(51) Int. Cl.
*G01S 17/42* (2006.01)
*G01S 7/481* (2006.01)
*G01S 17/894* (2020.01)

(52) U.S. Cl.
CPC ............ *G01S 17/42* (2013.01); *G01S 7/4815* (2013.01); *G01S 7/4816* (2013.01); *G01S 17/894* (2020.01)

(58) Field of Classification Search
None
See application file for complete search history.

(56) References Cited

U.S. PATENT DOCUMENTS 10,754,034 B1 * 8/2020 Chamberlain ........ G01S 7/4817
2018/0059248 A1 * 3/2018 O'Keeffe .............. G01S 7/4813
(Continued)

FOREIGN PATENT DOCUMENTS

JP 2014081332 A 5/2014
WO 2021067377 A1 4/2021

OTHER PUBLICATIONS

Notification of Transmittal of the International Search Report and the Written Opinion of the International Searching Authority, or the Declaration, in corresponding PCT Application No. PPCT/US2021/055981 (Feb. 15, 2022).

*Primary Examiner* — Luke D Ratcliffe
(74) *Attorney, Agent, or Firm* — Kilpatrick Townsend & Stockton LLP

(57) ABSTRACT

A Light Detection and Ranging (LIDAR) system includes a lidar emitter comprising one or more emitter elements configured to emit optical signals defining a primary field of illumination; a lidar detector comprising one or more detector pixels configured to detect light corresponding to the optical signals over a primary field of detection; and one or more reflective optical elements that are arranged to reflect one or more subsets of the optical signals into respective fields of illumination that are different than the primary field of illumination, and/or to reflect light from respective fields of view different than the primary field of detection toward the lidar detector. At least one of the respective fields of illumination or the respective fields of view does not overlap with the primary field of illumination or the primary field of detection, respectively.

21 Claims, 3 Drawing Sheets

(56) References Cited

U.S. PATENT DOCUMENTS

| | | | | |
|---|---|---|---|---|
| 2018/0301872 | A1 | 10/2018 | Burroughs et al. | |
| 2018/0301874 | A1 | 10/2018 | Burroughs et al. | |
| 2018/0301875 | A1 | 10/2018 | Burroughs et al. | |
| 2019/0227175 | A1* | 7/2019 | Steinberg ................ | G01S 17/89 |
| 2019/0250257 | A1 | 8/2019 | Finkelstein et al. | |
| 2020/0057151 | A1 | 2/2020 | Finkelstein et al. | |
| 2020/0249318 | A1 | 8/2020 | Henderson et al. | |
| 2020/0284884 | A1 | 9/2020 | Henderson et al. | |
| 2020/0319340 | A1 | 10/2020 | Sun et al. | |

* cited by examiner

SEGMENTED FLASH LIDAR USING STATIONARY REFLECTORS

CLAIM OF PRIORITY

This application is a 35 U.S.C. § 371 national stage application of PCT Application No. PCT/US2021/055981, filed Oct. 21, 2021, which claims priority from U.S. Provisional Patent Application Ser. No. 63/104,155, filed Oct. 22, 2020, the disclosures of which are incorporated by reference herein in their entireties. The above-referenced PCT Application was published in the English language as International Publication No. WO 2022/087222 A1 on Apr. 28, 2022.

FIELD

The present invention relates generally to Light Detection And Ranging (LIDAR; also referred to herein as lidar)-based imaging systems and related methods of operation.

BACKGROUND

Time of flight (ToF)-based imaging is used in a number of applications including range finding, depth profiling, and 3D imaging (e.g., lidar). Direct time of flight (dToF) measurement includes directly measuring the length of time between emitting radiation by emitter element(s) of the lidar system and sensing the radiation at detector element(s) of the lidar system after reflection from an object or other target, where the reflected radiation may be referred to as an “echo” signal. From this length of time, the distance to the target can be determined. Indirect time of flight (iToF) measurement includes determining the distance to the target by phase modulating the amplitude of the signals emitted by emitter element(s) of the lidar system and measuring phases (e.g., with respect to delay or shift) of the echo signals received at detector element(s) of the lidar system. These phases may be measured with a series of separate measurements or samples.

It may be desirable to achieve a wide field of view when using a lidar system. Scanning systems may be undesirable due to expense and/or reliability issues. Moreover, mechanically rotating systems may be undesirable due to inefficiencies associated with scanning a full 360 degrees, while many applications may require acquisition from less than 360 degrees.

Flash-type lidar, which can use a pulsed light emitting array to emit light for short durations over a relatively large area to acquire images, may allow for solid-state imaging of a large field of view or scene. Typically, flash-type lidar systems have a limited field of view, for example, less than 360 degrees or less than 180 degrees. Often, e.g., in automotive applications, it may be necessary to image a wide field of view. The wide field of view may be achieved by using more than one lidar system, which may result in higher cost and/or may require greater computational resources. For example, if more than one lidar system is used, then multiple sets of lenses, multiple sets of driver electronics, and multiple detectors chips may be required.

In some applications such as long range automotive lidar, it may be desirable to image a long range in multiple directions, for example, in both in the direction of motion of the automobile and in the reverse direction. With some flash lidar implementations, two lidar systems (one facing each direction) may be required.

SUMMARY

Some embodiments described herein provide methods, systems, and devices including electronic circuits to address the above and other problems by providing a lidar system including a lidar emitter having one or more light emitter elements (including one or more semiconductor lasers, such as surface- or edge-emitting laser diodes, including vertical cavity surface emitting lasers (VCSELs); generally referred to herein as emitters), and a lidar detector having one or more light detector pixels (including one or more semiconductor photodetectors, such as photodiodes, including avalanche photodiodes and single-photon avalanche detectors (SPADs); generally referred to herein as detectors). The lidar system further includes one or more reflective (including partially-reflective and partially-transmissive) or refractive optical elements (e.g., one or more mirrors) arranged within a field of illumination of the lidar emitter and/or a field of detection of the lidar detector, and a control circuit that is configured to operate the emitter elements and/or detector pixels (including respective emitters and/or detectors thereof) to provide a 3D time of flight (ToF) flash lidar system with multiple different fields of illumination and/or fields of detection.

According to some embodiments of the present disclosure, a Light Detection and Ranging (LIDAR) system includes a lidar emitter comprising one or more emitter elements configured to emit optical signals defining a primary field of illumination; a lidar detector comprising one or more detector pixels configured to detect light corresponding to the optical signals over a primary field of detection; and one or more reflective optical elements. The one or more reflective optical elements are arranged to reflect one or more subsets of the optical signals into respective fields of illumination that are different than the primary field of illumination, where at least one of the respective fields of illumination does not overlap with the primary field of illumination; and/or reflect light from respective fields of view different than the primary field of detection toward the lidar detector, where at least one of the respective fields of view does not overlap with the primary field of detection.

According to some embodiments of the present disclosure, a Light Detection and Ranging (LIDAR) system includes a lidar emitter comprising one or more emitter elements configured to emit optical signals defining a primary field of illumination; and one or more reflective optical elements that are arranged to reflect one or more subsets of the optical signals into respective fields of illumination that are different than the primary field of illumination, where at least one of the respective fields of illumination does not overlap with the primary field of illumination.

In some embodiments, the primary field of illumination comprises a first field of illumination and one or more additional fields of illumination, and the one or more reflective optical elements are arranged to obstruct the one or more additional fields of illumination, optionally without altering the first field of illumination.

In some embodiments, the lidar emitter is configured to be mounted facing a first direction, and the at least one of the respective fields of illumination comprises a second field of illumination in a second direction that differs from the first direction by about 60 degrees or more, by about 90 degrees or more, by about 120 degrees or more, or by about 180 degrees or more.

In some embodiments, the one or more emitter elements comprises first and second emitter elements, the first emitter elements are configured to provide the first field of illumination, and the second emitter elements and the one or more reflective optical elements are configured to provide the second field of illumination.

In some embodiments, an emitter control circuit is coupled to the lidar emitter and configured to activate the first and second emitter elements to provide the first and second fields of illumination, respectively, sequentially and/or with different power levels.

In some embodiments, the first field of illumination and the respective fields of illumination collectively illuminate an angular range of up to 360 degrees relative to the first direction.

According to some embodiments of the present disclosure, a Light Detection and Ranging (LIDAR) system includes a lidar detector comprising one or more detector pixels configured to detect light corresponding to optical signals from a lidar emitter over a primary field of detection; and one or more reflective optical elements that are arranged to reflect light from respective fields of view different than the primary field of detection toward the lidar detector, where at least one of the respective fields of view does not overlap with the primary field of detection.

In some embodiments, the primary field of detection comprises a first field of view and one or more additional fields of view, and the one or more reflective optical elements are arranged to obstruct the one or more additional fields of view, optionally without altering the first field of view.

In some embodiments, the lidar detector is configured to be mounted facing a first direction, and the at least one of the respective fields of view comprises a second field of view in a second direction that differs from the first direction by about 60 degrees or more, by about 90 degrees or more, by about 120 degrees or more, or by about 180 degrees or more.

In some embodiments, the one or more detector pixels comprise first and second detector pixels, the first detector pixels are configured to image the first field of view, and the second detector pixels and the one or more reflective optical elements are configured to image the second field of view.

In some embodiments, a detector control circuit is coupled to the lidar detector and is configured to activate the first and second detector pixels to image the first and second fields of view, respectively, sequentially and/or with different sensitivity levels, optionally synchronously or in coordination with activation of first and second emitter elements of a lidar emitter to sequentially provide first and second fields of illumination, respectively.

In some embodiments, at least one control circuit is coupled to the lidar detector. The at least one control circuit is configured to receive respective detection signals output from the first and second detector pixels; calculate a distance, position, and/or direction of a first target in the first field of view relative to the first direction responsive to the respective detection signals output from the first detector pixels; and calculate a distance, position, and/or direction of a second target in the second field of view relative to the first direction responsive to the respective detection signals output from the second detector pixels.

In some embodiments, the first field of view and the respective fields of view collectively image an angular range of up to 360 degrees relative to the first direction.

In some embodiments, the one or more reflective optical elements comprise a shared element that is configured to reflect the one or more subsets of the optical signals into one of the respective fields of illumination and to reflect the light from one of the respective fields of view toward the lidar detector.

In some embodiments, the one or more reflective optical elements comprise static elements that are arranged in respective fixed positions within the primary field of illumination and/or the primary field of detection.

In some embodiments, the one or more reflective optical elements comprises one or more mirrors.

In some embodiments, the one or more reflective optical elements comprises one or more reflective surfaces of a housing comprising the lidar emitter and/or the lidar detector.

In some embodiments, the first direction is a forward direction of travel of an autonomous vehicle.

In some embodiments, at least one control circuit is coupled to the lidar emitter and/or the lidar detector. The at least one control circuit is configured to operate the lidar emitter and/or the lidar detector to provide the first field of illumination and/or the first field view responsive to detecting a first vehicle operational mode for travel in the forward direction; and operate the lidar emitter and/or the lidar detector to provide the second field of illumination and/or the second field view responsive to detecting a second vehicle operational mode for travel in a reverse direction of travel.

In some embodiments, the one or more reflective optical elements are arranged to provide the respective fields of illumination and/or the respective fields of view in two or more dimensions.

Other devices, apparatus, and/or methods according to some embodiments will become apparent to one with skill in the art upon review of the following drawings and detailed description. It is intended that all such additional embodiments, in addition to any and all combinations of the above embodiments, be included within this description, be within the scope of the invention, and be protected by the accompanying claims.

DETAILED DESCRIPTION

Embodiments of the present invention provide a flash lidar system with a segmented field of view, such that a lidar emitter and a lidar receiver or detector can image multiple fields of view, for example, in both forward and backward directions (relative to the lidar emitter and detector), without movement of the lidar emitter and detector. In some embodiments, one or more or all of the components of the lidar system (e.g., the lidar emitter, the lidar detector, and one or more reflective or refractive elements) may be stationary or static elements with fixed positions, that is, such that multiple fields of view can be imaged without any motion of any part of the lidar system. As used herein, a "fixed" element or component may refer to an element or component that is static and has a position that is not altered (relative to other lidar system elements) during operation of the lidar system. In some embodiments, the present invention provides an architecture for imaging multiple fields of view in different directions (relative to the lidar emitter) with a single lidar system (e.g., a lidar emitter and lidar detector) and one or more mirrors or other reflective optical elements or surfaces. Reflective optical elements or surfaces as described herein are primarily reflective of light of a desired wavelength range (such as the wavelength(s) of light emitted from the lidar emitter, also referred to herein as the operational wavelength range of the lidar system), with comparatively minimal to no refraction of the light of the desired wavelength range. In contrast, refractive optical elements or surfaces as described herein are primarily refractive of light of a desired wavelength range, with comparatively minimal to no reflection of light of the desired wavelength range.

Figure 1:
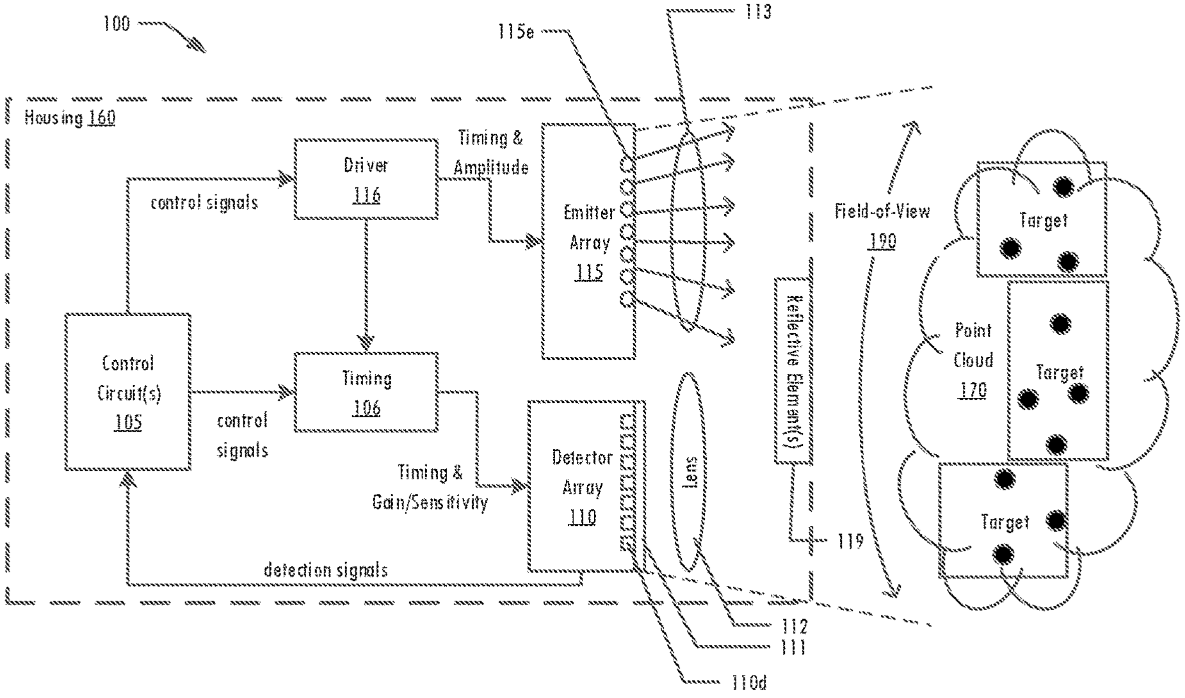
FIG. 1 is a schematic block diagram illustrating an example of a lidar system or circuit in accordance with embodiments of the present invention.

An example of a lidar system or circuit 100 in accordance with embodiments of the present disclosure is shown in FIG. 1. The lidar system 100 includes a control circuit 105, a timing circuit 106, lidar emitter implemented as an emitter array 115 including a plurality of emitters 115*e*, and a lidar detector implemented as a detector array 110 including a plurality of detectors 110*d*, which in some embodiments may be implemented in a common housing 160. The detectors 110*d* include time-of-flight sensors (for example, an array of single-photon detectors, such as SPADs). One or more of the emitter elements 115*e* of the emitter array 115 may define emitter units that respectively emit a radiation pulse or continuous wave signal at a time and frequency controlled by a timing generator or driver circuit 116. In particular embodiments, the emitters 115*e* may be pulsed light sources, such as LEDs or lasers (such as vertical cavity surface emitting lasers (VCSELs)), that are configured to emit light with the operational wavelength range of the lidar system 100. Radiation is reflected back from a target 150, and is sensed by detector pixels defined by one or more detector elements 110*d* of the detector array 110. The control circuit 105 implements a pixel processor that measures and/or calculates the time of flight of the illumination pulse over the journey from emitter array 115 to target 150 and back to the detectors 110*d* of the detector array 110, using direct or indirect ToF measurement techniques.

In some embodiments, an emitter module or circuit 115 may include an array of emitter elements 115*e* (e.g., VCSELs), a corresponding array of optical elements 113 coupled to one or more of the emitter elements (e.g., lens(es) 113, such as microlenses), and/or driver electronics 116. The optical elements 113 may be configured to provide a sufficiently low beam divergence of the light output from the emitter elements 115*e* so as to ensure that respective fields of illumination of either individual or groups of emitter elements 115*e* do not significantly overlap, and yet provide a beam divergence of the light output from the emitter elements 115*e* to provide eye safety to observers. The optical elements 113 may not be included in some embodiments.

The emitters 115*e* may be provided on a non-planar or curved or flexible substrate 115*s* so as to contribute to the desired illumination pattern, e.g., the segmented field of illumination described herein. In addition, as discussed herein, one or more reflective optical elements 119 may be arranged or positioned within at least a portion of the field of illumination of the emitter array 115. The reflective optical element(s) 119 may be provided in one or more fixed positions relative to the orientation of the emitter array 115, so as to direct optical signals to multiple different fields of illumination as described herein. In some embodiments, the system 100 may be free of a diffuser element between the emitters 115*e* and the reflective element 119.

The driver electronics 116 may each correspond to one or more emitter elements, and may each be operated responsive to timing control signals with reference to a master clock and/or power control signals that control the peak power of the light output by the emitter elements 115*e*. In some embodiments, each of the emitter elements 115*e* in the emitter array 115 is connected to and controlled by a respective driver circuit 116. In other embodiments, respective groups of emitter elements 115*e* in the emitter array 115 (e.g., emitter elements 115*e* in spatial proximity to each other), may be connected to a same driver circuit 116. The driver circuit or circuitry 116 may include one or more driver transistors configured to control the modulation frequency, timing and amplitude of the optical signal emission that is output from the emitters 115*e*. The maximum optical power output of the emitters 115*e* may be selected to generate a signal-to-noise ratio of the echo signal from the farthest, least reflective target at the brightest background illumination conditions that can be detected in accordance with embodiments described herein.

Light emission output from one or more of the emitters 115*e* impinges on and is reflected by one or more targets 150, and the reflected light is detected as an optical signal (also referred to herein as a return signal, echo signal, or echo) by one or more of the detectors 110*d* (e.g., via receiver optics 112), converted into an electrical signal representation (referred to herein as a detection signal), and processed (e.g., based on time of flight) to define a 3-D point cloud representation 170 of a field of view 190. Operations of lidar systems in accordance with embodiments of the present disclosure as described herein may be performed by one or more processors or controllers, such as the control circuit 105 of FIG. 1.

The field of view 190 shown in FIG. 1 may include the multiple fields of view that can be imaged by lidar systems in accordance with embodiments of the present disclosure, such as the first and second fields of illumination and first and second fields of view shown in FIGS. 3A-3B and 4A-4B. That is, the field of view 190 may collectively represent multiple fields of view, which may be overlapping or non-overlapping, and/or may be in two or more different directions relative to an orientation of the lidar system 100.

In some embodiments, a receiver/detector module or circuit 110 includes an array of detector pixels (with each detector pixel including one or more detectors 110*d*, e.g., SPADs), receiver optics 112 (e.g., one or more lenses to collect light over the field of view 190), and receiver electronics (including timing circuit 106) that are configured to power, enable, and disable all or parts of the detector array 110 and to provide timing signals thereto. The detector pixels can be activated or deactivated with at least nanosecond precision, and may be individually addressable, addressable by group, and/or globally addressable. The receiver optics 112 may include a macro lens that is configured to collect light from the largest field of view that can be imaged by the lidar system, microlenses to improve the collection efficiency of the detecting pixels, and/or anti-reflective coating to reduce or prevent detection of stray light. In some embodiments, a spectral filter 111 may be provided to pass or allow passage of "signal" light (i.e., light of wavelengths corresponding to those of the optical signals output from the emitters) but substantially reject or prevent passage of "background" or non-signal light (i.e., light of wavelengths different than the optical signals output from the emitters).

The detectors 110*d* may be provided in an array 110 and/or the collection optics 112 may be configured so as to image respective portions of a desired field of detection, e.g., the segmented field of view described herein. In addition, as discussed herein, one or more reflective optical elements 119 may be arranged or positioned within at least a portion of the field of view of the detector array 110. The reflective optical element(s) 119 may be provided in one or more fixed positions relative to the orientation of the detector array 110, so as to direct light from multiple different fields of view onto the detector array 110. The reflective optical element(s) 119 may include reflective optical elements that are shared or common to both the emitter 115 and detector 110 assemblies, or may include distinct reflective optical elements for each of the emitter 115 and detector 110 assemblies. More generally, the reflective optical element(s) 119 may represent any combination of reflective elements that are positioned and/or otherwise configured to direct light from the emitter 115 and/or to the detector 110 to provide the respective fields of illumination and/or respective fields of view/detection described herein.

The detectors 110*d* of the detector array 110 are connected to the timing circuit 106. The timing circuit 106 may be phase-locked to the driver circuitry 116 of the emitter array 115. The sensitivity of each of the detectors 110*d* or of groups of detectors may be controlled. For example, when the detector elements include reverse-biased photodiodes, avalanche photodiodes (APD), PIN diodes, Silicon Photomultipliers (SiPM) and/or Geiger-mode Avalanche Diodes (SPADs), the reverse bias may be adjusted, whereby, the higher the overbias, the higher the sensitivity.

In some embodiments, a control circuit 105, such as a microcontroller or microprocessor, provides different emitter control signals to the driver circuitry 116 of different emitters 115*e* and/or provides different signals (e.g., strobe signals) to the timing circuitry 106 of different detectors 110*d* to enable/disable different detectors 110*d* (or subsets of detectors 110*d* in different regions of the array 110) so as to detect the echo signals from targets 150 in different fields of view, in some instances during different portions of an imaging frame or subframe. The control circuit 105 may also control memory storage operations for storing data indicated by the detection signals in a non-transitory memory or memory array 205.

In some embodiments the respective fields of illumination and/or fields of view are configured to be activated by the control circuit 105 (e.g., a central processing unit) based on the operation mode of a vehicle. For example, when a car is in a forward operation mode (e.g., "Drive"), the lidar emitter 115 and/or detector 110 may be configured to provide respective fields of illumination/fields of view in one or more forward-facing directions. When the car is in a reverse operation mode (e.g., "Reverse"), the lidar emitter 115 and/or detector 110 may be configured to provide respective fields of illumination/fields of view in one or more reverse-facing directions.

"Strobing" as used herein may refer to the generation of detector control signals (also referred to herein as strobe signals or "strobes") to control the timing and/or duration of activation (detection or strobe windows) of one or more detectors 110*d* of the lidar system 100. That is, some embodiments described herein can utilize range strobing (i.e., biasing the SPADs to be activated and deactivated for durations or windows of time over the emitter cycle, at variable delays with respect to the firing of the emitter (e.g., a laser), thus capturing reflected signal photons corresponding to specific distance sub-ranges at each window/frame) to limit the number of ambient photons acquired in each emitter cycle. An emitter cycle (e.g., a laser cycle) refers to the time between emitter pulses. In some embodiments, the emitter cycle time is set as or otherwise based on the time required for an emitted pulse of light to travel round trip to the farthest allowed target and back, that is, based on a desired distance range.

A range-strobing flash lidar (e.g., with strobe windows corresponding to respective distance sub-ranges, and with subframes collecting data based on the detection signals output during a respective strobe window) may use strobing for several reasons. For example, in some embodiments, detector elements may be combined into pixels and the detector elements and/or pixels may be selectively activated after the emission of optical signals to detect echo signals from a target during specific strobe windows. The detected echo signals may be used to generate a histogram of detected "counts" of photons incident on the detector from the echo signal. Examples of methods to detect a target distance based on histograms are discussed, for example, in U.S. Patent Application Publication No. 2019/0250257, entitled "Methods And Systems For High-Resolution Long-Range Flash Lidar," the contents of which are incorporated herein by reference.

Figure 2:
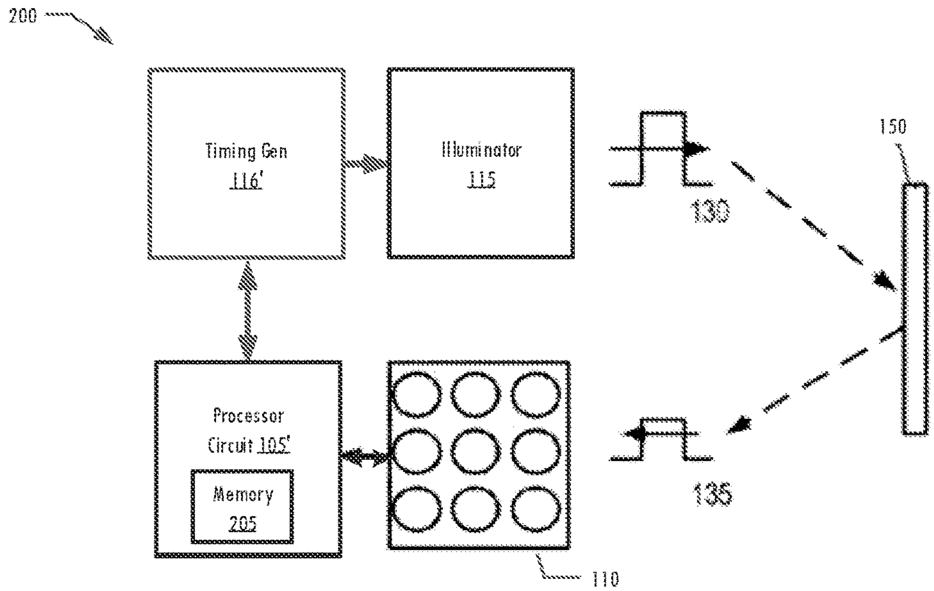
FIG. 2 is a schematic block diagram illustrating components of a ToF measurement system or circuit in a lidar application in accordance with some embodiments of the present invention.

FIG. 2 further illustrates components of a ToF measurement system or circuit 200 in a LIDAR application in accordance with some embodiments described herein. The circuit 200 may include a processor circuit 105' (such as a digital signal processor (DSP)), a timing generator 116' which controls timing of the illumination source (illustrated by way of example with reference to a laser emitter array 115), and an array of single-photon detectors (illustrated by way of example with reference to a single-photon detector array 110). The processor circuit 105' may also include a sequencer circuit that is configured to coordinate operation of the emitters 115*e* and detectors 110*d*.

The processor circuit 105' and the timing generator 116' may implement some of the operations of the control circuit 105 and the driver circuit 116 of FIG. 1. The emitter array 115 emits a laser pulse 130 at a time controlled by the timing generator 116'. Light 135 from the laser pulse 130 is reflected back from a target (illustrated by way of example as object 150), and is sensed by single-photon detector array 110. The processor circuit 105' implements a pixel processor that measures the ToF of the laser pulse 130 and its reflected signal 135 over the journey from emitter array 115 to object 150 and back to the single-photon detector array 110.

The processor circuit 105' may provide analog and/or digital implementations of logic circuits that provide the necessary timing signals (such as quenching and gating or strobe signals) to control operation of the single-photon detectors of the array 110 and process the detection signals output therefrom. For example, the single-photon detectors of the array 110 may generate detection signals in response to incident photons only during the short gating intervals or strobe windows that are defined by the strobe signals. Photons that are incident outside the strobe windows have no effect on the outputs of the single photon detectors. More generally, the processor circuit 105' may include one or more circuits that are configured to generate the respective detector control signals that control the timing and/or durations of activation of the detectors 110*d*, and/or to generate respective emitter control signals that control the output of optical signals from the emitters 115*e*. Detection events may be identified by the processor circuit 105' based on one or more photon counts indicated by the detection signals output from the detector array 110, which may be stored in the memory 205.

The lidar system 100 (such as a flash lidar system) may be described herein with reference to horizontal and vertical components of the field of view, e.g., 30 degrees horizonal by 15 degrees vertical. The lidar emitter 115 (such as an array of emitter elements) illuminates or emits optical signals over a field of illumination, and the lidar receiver or detector 110 (such as an array of detector pixels) images or receives light including reflections or echos of the optical signals over a field of detection (also referred to herein as a detector field of view). The field of view of the lidar system 100 may thus be referred to herein as including the field of illumination of optical signal emission from the emitter 115, the field of detection over which light is detected by the receiver or detector 110 (also referred to as a detector field of view), and the intersection thereof. It may be desirable for the field of illumination and the field of detection/detector field of view to overlap as much as possible.

If a reflective optical element (e.g., a first mirror) has a fixed position in front of (i.e., in a field of illumination of) the lidar emitter and normal to its optical axis, some of the optical signal emission from the emitter will be reflected directly from the reflective optical element towards the receiver or lidar detector (e.g., without being directed into the field of view and without being reflected by one or more targets). However, in some embodiments of the present invention, a first mirror is fixed at an angle relative to the optical axis of the lidar emitter, such that the optical signal will be reflected from the surface of the first mirror to illuminate a different field of illumination. In some embodiments, another reflective optical element (e.g., a second mirror) is positioned or placed properly or at a desired location relative to the first mirror, and the light reflected from one or more targets in the different field of illumination can be reflected or directed towards collection optics for collection, detection by the lidar detector, and further signal processing. That is, in some embodiments, one or more static reflective optical elements or surfaces may be used to direct the optical signals from the lidar emitter to multiple fields of illumination and/or to direct light from multiple fields of detection to the lidar detector.

As an example, in some embodiments of the present invention, a lidar emitter is configured to emit optical signals that define an overall or primary emitter field of illumination (FOI) in a first direction relative to the lidar emitter, such as a forward-facing direction. The primary field of illumination includes a desired (e.g., first) field of illumination, and one or more additional field(s) of illumination that is/are beyond the first field of illumination. The desired/first and additional fields of illumination may each include a horizontal component and a vertical component. The primary emitter field of illumination in the first direction is greater (with respect to one or more of the horizontal and vertical components) than the desired, first field of illumination (e.g., with twice the desired vertical component). The difference between the primary emitter field of illumination and the desired, first field of illumination is referred to herein as additional illumination (having an excess horizontal and/or excess vertical component).

Similarly, a lidar detector is configured to receive optical signals from a primary detector field of view (FOV) or field of detection (FOD) in a first direction relative to the lidar detector, such as a forward-facing direction. The primary detector field of view includes a desired (e.g., first) field of view, and at least one additional field of view that is beyond the desired first field of view. The desired/first and additional detector fields of view may each include a horizontal component and a vertical component. The primary detector field of view FOV in the first direction is greater (with respect to one or more of the horizontal and vertical components) than the desired, first field of view (e.g., with twice the desired vertical component). The difference between the primary detector field of view and the desired, first field of view is referred to herein as additional field of view (having an excess horizontal and/or excess vertical component).

One or more reflective optical elements is configured to direct the greater-than-desired or additional field(s) of illumination towards at least one second direction, different from the first direction, thereby defining a second field of illumination and thus "segmenting" the overall or primary emitter field of illumination FOI (illustrated by way of example with reference to a first segment and a second segment, but it will be understood that more than two segments may be provided in accordance with embodiments described herein). The second direction(s) may differ from the first direction by more than about 60 degrees, more than about 90 degrees, more than about 120 degrees, or by about 180 degrees (i.e., an opposite direction). As such, the first field of illumination and the additional field(s) of illumination can collectively illuminate an angular range of up to 360 degrees relative to the first direction. Likewise, the one or more reflective optical elements is configured to direct light reflected from one or more targets in a second field of view (which may correspond to the second field of illumination) back toward the lidar detector, thereby "segmenting" the overall or primary detector field of view FOV (illustrated by way of example with reference to a first segment and a second segment), and allowing for imaging of an angular range of up to about 360 degrees. As noted above, the reflective optical elements that direct the additional field(s) of illumination from the emitter(s) into the second direction(s) (which may be referred to as illuminating elements) and the reflective optical elements that direct the additional field(s) of view from the second direction(s) to the detector(s) (which may be referred to as imaging elements) may be the same reflective elements (i.e., shared elements that provide both illumination and imaging) or different reflective elements (i.e., distinct elements that provide illumination and imaging, respectively).

As used herein a reflective optical element may be configured to reflect light of the wavelength or range of wavelengths of the optical signal emission from the lidar emitter, and may include partially-reflective and partially-transmissive optical elements. In some embodiments, the reflective optical elements as described herein may be wavelength-selective optical elements that are configured to reflect light of a desired wavelength/range without substantially affecting propagation of light outside the desired wavelength/range. For example, a wavelength-selective optical element may include a reflective surface and an optical filter that is configured to selectively transmit particular wavelengths of incident light to the reflective surface for reflection of the optical signals from the lidar emitter. The reflective optical element(s) may have a fixed position relative to the lidar emitter and/or lidar detector. For example, in some embodiments, the lidar emitter, lidar detector, and the reflective optical element(s) may be static, non-moveable elements mounted in respective fixed positions within a common housing 160. For example, the lidar emitter and lidar detector may be positioned in a side-by-side (e.g., horizontally-adjacent) arrangement or a upper and lower (e.g., vertically-adjacent) arrangement relative to one another in the common housing 160. In some embodiments, one or more internal surfaces of the common housing 160 may implement the reflective optical element(s) 119. In some embodiments, the reflective optical elements may be implemented by one or more beam splitters (for example, a splitting mirror that is configured to split the emitter light in one or more directions) and/or partially-reflective mirrors.

Figure 3A:
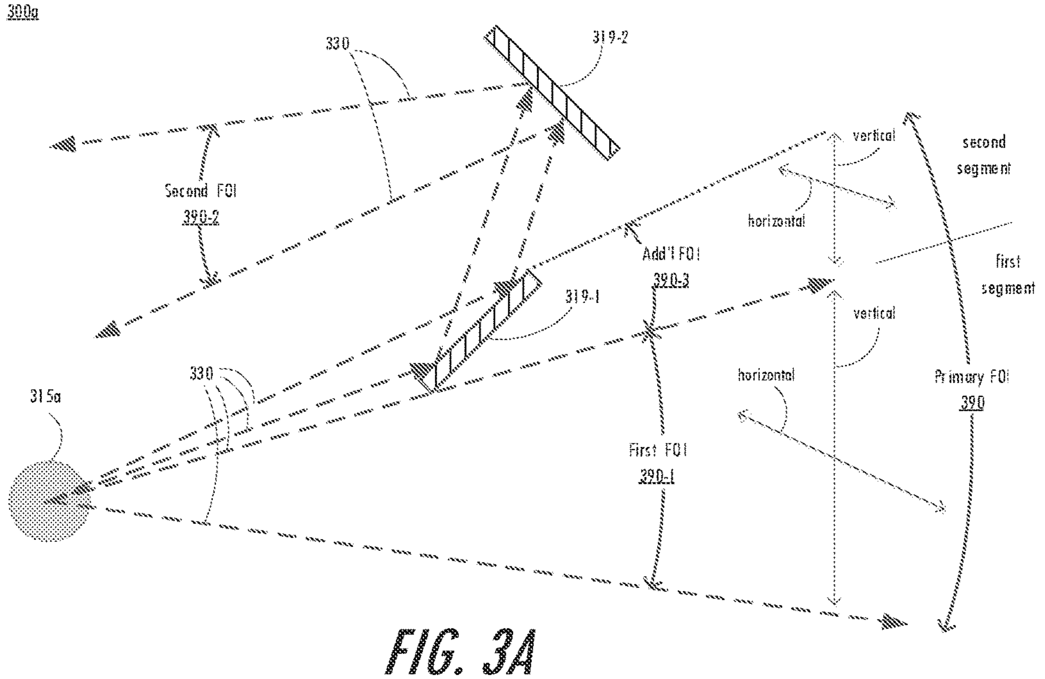
FIGS. 3A and 3B are schematic diagrams illustrating operation of lidar emitters with static reflective optical elements in accordance with some embodiments of the present invention.
Figure 3B:
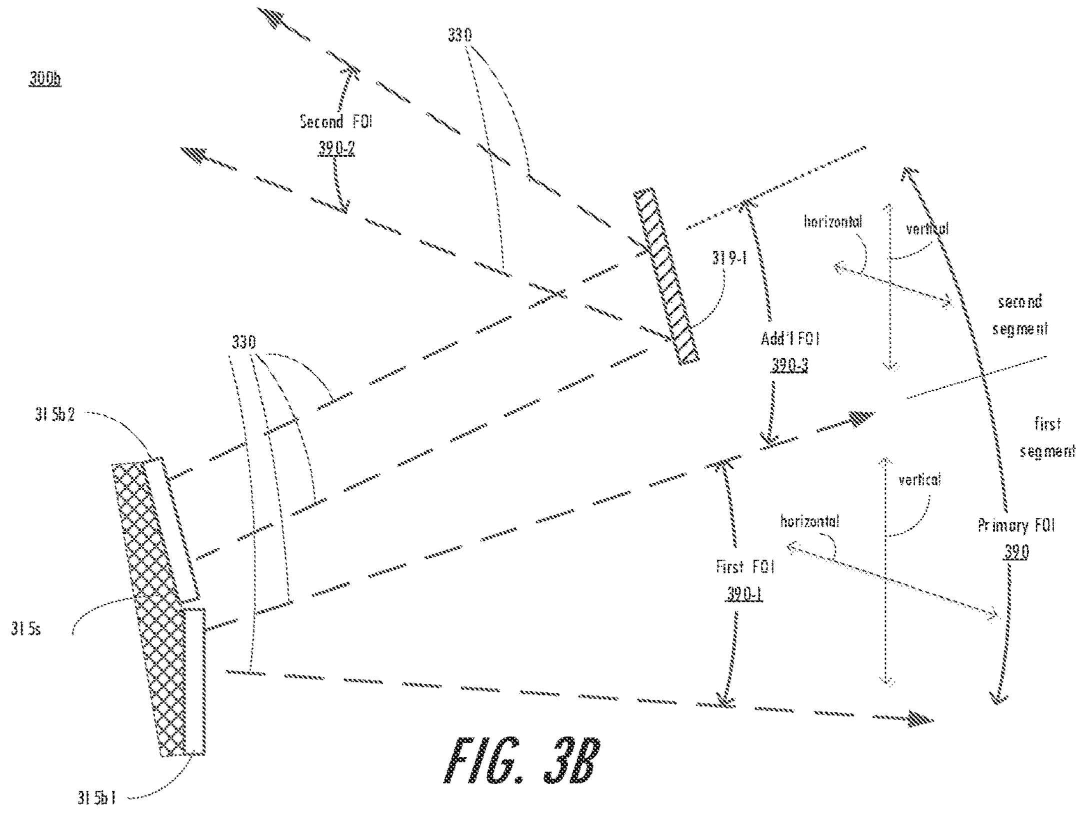

FIGS. 3A and 3B are emitter diagrams illustrating operation of lidar emitters 300*a*, 300*b* with static reflective optical elements 319-1, 319-2 (collectively 319) in accordance with some embodiments of the present invention. As shown in the examples of FIGS. 3A and 3B, the lidar emitter 300*a*, 300*b* includes one or more emitter elements 315*a*, 315*b*1, 315*b*2 (collectively 315) configured to emit optical signals 330 in a first (e.g., forward or front-facing) direction to define a primary field of illumination 390 (FOI). A first reflective optical element 319-1 (Mirror 1) is positioned in a portion of (e.g., placed adjacent a top edge/boundary of) the primary field of illumination 390 (FOI) of the lidar emitter 300*a* in the first direction. The primary field of illumination 390 includes a first or desired field of illumination 390-1 and one or more additional or excess fields of illumination 390-3. The reflective optical element 319-1 (Mirror 1) is arranged to obstruct to the additional field of illumination 390-3, such that the first reflective optical element 319-1 (Mirror 1) does not block or otherwise alter the desired first (frontward) field of illumination 390-1, and such that the first reflective optical element 319-1 (Mirror 1) reflects a subset or portion (e.g., half) of the optical signal emission 330 from the lidar emitter 300*a* towards a second (e.g., back-facing) direction to define a second (e.g., backward) field of illumination 390-2, which is different from (e.g., opposite to) the first field of illumination 390-1. In the examples of FIGS. 3A and 3B, the second field of illumination 390-2 does not overlap the primary field of illumination 390.

More particularly, in the example of FIG. 3A, a second reflective optical element 319-2 (Mirror 2) receives the reflected subset or portion of the optical signal emission 330 from the first reflective optical element 319-1 (Mirror 1), and directs the optical signal emission 330 in the second direction to define the second field of illumination 390-2. Alternatively, in the example of FIG. 3B, a lidar emitter 300*b* including multiple emitter elements 315*b*1, 315*b*2 and/or beam shaping optics is used to define the overall or primary field of illumination 390 (FOI), and a single reflective optical element 319-1 (Mirror 1) is used to reflect the subset or portion of the optical signals 330 of the additional field of illumination 390-3 into the second direction to define the second field of illumination 390-2.

For example, in FIG. 3B, one or more first emitter element(s) 315*b*1 and/or beam shaping optics may be configured to emit optical signals 330 defining the first field of illumination 390-1 in the first direction, and one or more second emitter element(s) 315*b*2 and/or beam shaping optics may be configured to emit optical signals 330 defining the additional field of illumination 390-3 in the first direction. In some embodiments, a non-planar (e.g., curved or patterned) non-native substrate 315*s* may be used to provide different or tilted orientations between the first and second emitter elements 315*b*1 and 315*b*2, as described for example in U.S. Patent Application Publication No. 2018/0301874 to Burroughs et al., the disclosure of which is incorporated by reference herein in its entirety. The reflective optical element 319-1 (Mirror 1) may be positioned in the optical path of the second emitter element(s) 315*b*2 and/or beam shaping optics so as to reflect the subset or portion of the optical signals 330 of the additional field of illumination 390-3 in the second direction to define the second field of illumination 390-2. Thus, the primary field of illumination 390 (FOI) of the lidar emitter 300*a*, 300*b* is optically divided into multiple (e.g., first and second) angular segments 390-1, 390-3, and a single emitter element or array 315 that is oriented in a fixed direction can be used to illuminate multiple fields of illumination 390-1, 390-2, at least one of which is beyond and/or non-overlapping with the primary field of illumination 390.

Figure 4A:
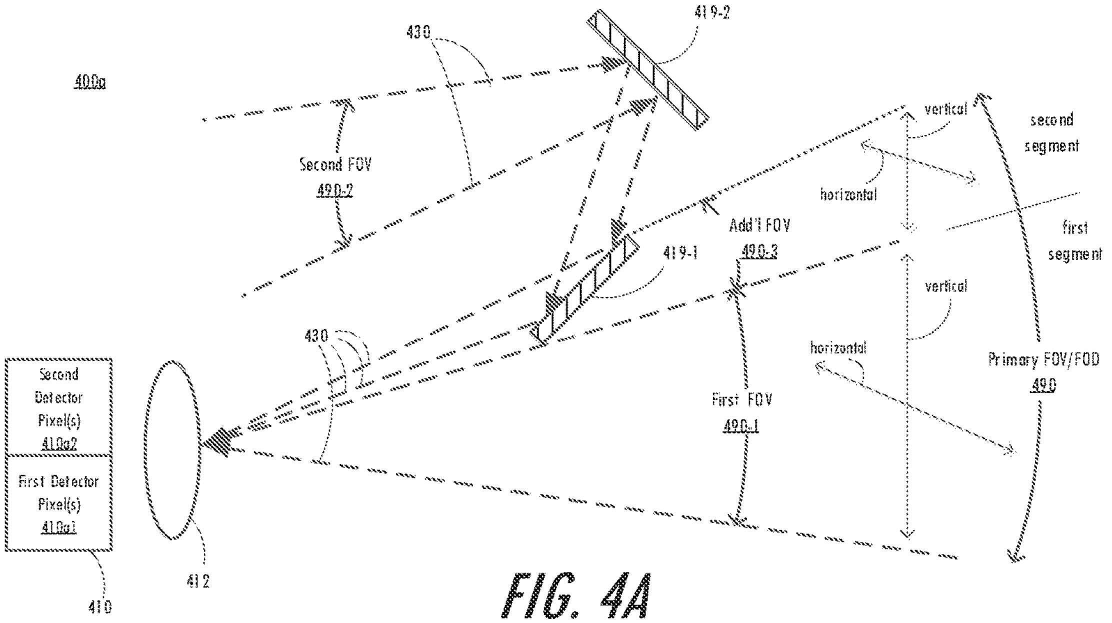
FIGS. 4A and 4B are schematic diagrams illustrating operation of lidar detectors with static reflective optical elements in accordance with some embodiments of the present invention.
Figure 4B:
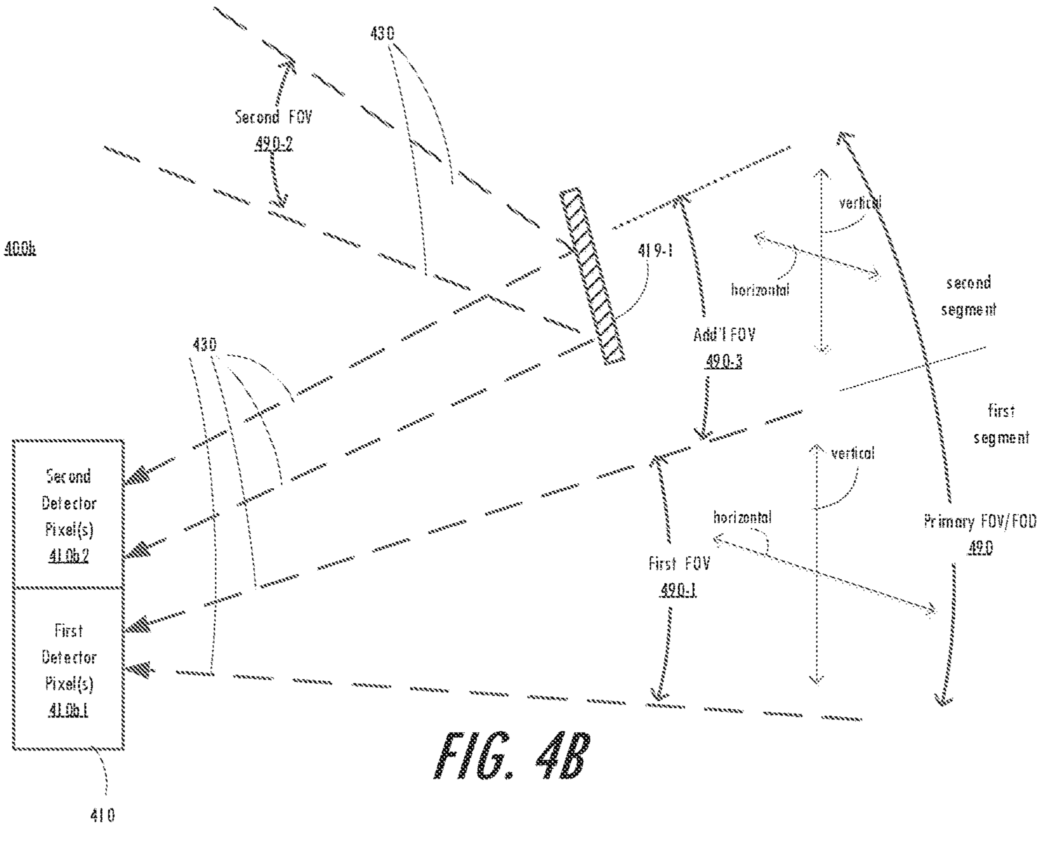

FIGS. 4A and 4B are detector diagrams illustrating operation of lidar detectors 400*a*, 400*b* with static reflective optical elements 419-1, 419-2 (collectively 419) in accordance with some embodiments of the present invention. In particular, FIG. 4A illustrates a detector configuration 400*a* that may be used with emitter configuration 300*a* of FIG. 3A, and FIG. 4B illustrates a detector configuration 400*b* that may be used with emitter configuration 300*b* of FIG. 3B. However, it will be understood that the detector configurations 400*a*, 400*b* described herein are not limited for use with any particular emitter configurations, and may be used with other emitter configurations (including scanning or rotating emitter configurations) in some embodiments of the present invention.

As shown in the examples of FIGS. 4A and 4B, the lidar detector 400*a*, 400*b* includes one or more detector elements 410*a*1, 410*a*2, 410*b*1, 410*b*2 (collectively 410) configured to detect optical signals 430 (e.g., echo signals or optical signals otherwise corresponding to the optical signals 330 from a lidar emitter) in a first (e.g., forward or front-facing) direction to define a primary field of detection 490 (FOV). A second reflective optical element 419-2 (e.g., Mirror 2) is positioned outside of (e.g., placed adjacent a top edge/boundary of) the primary field of detection 490 (FOV) of the lidar detector 400*a* in the first direction. The primary field of detection 490 includes a first or desired field of view 490-1 and one or more additional or excess fields of view 490-3. The first reflective optical element 419-1 (Mirror 1) is arranged to obstruct the additional field of view 490-3, without altering or affecting the first field of view 490-1. In the example of FIG. 4A, a second reflective optical element 419-2 (Mirror 2) is provided, which does not block the desired first field of view 490-1 or the additional field of view 490-3. The second reflective optical element 419-2 (Mirror 2) reflects light from a second (e.g., backward) field of view 490-2 in a second (e.g., back-facing) direction onto the receiver optics 412, for collection and direction onto a lidar detector 410, such as an array of detector pixels 410*a*1, 410*a*2 (referred to herein as a detector array). In the examples of FIGS. 4A and 4B, the second field of view 490-2 does not overlap the primary field of detection 490.

More particularly, in the example of FIG. 4A, the second reflective optical element 419-2 (Mirror 2) receives the optical signals 430 reflected from one or more targets in the second field of view 490-2 and reflects the optical signals 430 to a first reflective optical element 419-1 (Mirror 1), which is positioned to obstruct the additional field of view 490-3 and directs the optical signals 430 to the receiver optics 412. In FIG. 4A, the lidar detector 410 is positioned at a focal plane of the receiver optics 412. The receiver optics 412 is configured such that light from the first field of view 490-1 is imaged onto a first region of the focal plane, and a light from the second field of view 490-2 is imaged onto a second region of the focal plane. For example, the lidar detector 400*a* may include one or more first detector pixels 410*a*1 in the first region, and one or more second detector pixels 410*a*2 in the second region, such that each is configured to image a respective one of the first and second fields of view 490-1 and 490-2.

Alternatively, in the example of FIG. 4B, a single reflective optical element 419-1 (Mirror 1) is positioned in the primary field of detection 490 to obstruct the additional field of view 490-3 and reflect the optical signals 430 reflected from one or more targets in the second field of view 490-2 toward the one or more second detector pixels **410*b*2, while the one or more first detector pixels 410*b*1 are oriented to receive the optical signals 430 reflected from one or more targets in the first field of view 490-1. The reflective optical element 419-1 (Mirror 1) may be positioned outside of the optical path of the first detector pixel(s) 410*b*1 so as not to obstruct the first field of view 490-1. Thus, the primary detector field of view 490 (FOV) of the lidar detector 400*b* is optically divided into multiple (e.g., first and second) angular segments 4901, 490-3, and a single detector array 410 (optionally with a single receiver optical element) that is oriented in a fixed direction can be used to image multiple fields of view 490-1, 490-2, at least one of which is beyond and/or non-overlapping with the primary detector field of view 490**.

Also, respective regions of the detector array 410 (or subsets of the detector pixels **410*a*1, 410*a*2, 410*b*1, 410*b*2) are associated with respective ones of the multiple fields of view 490-1, 490-2 that are imaged by the detector 410 and the reflective optical elements 419. As such, detection signals output from first detector pixels 410*a*1, 410*b*1 or first regions of the detector array 410 may be recognized by one or more control circuits (such as the control circuits 105, 205 of the lidar systems 100, 200) as corresponding to the first field of view 490-1, while detection signals output from second detector pixels 410*a*2, 410*b*2 or second regions of the detector array 410 may be recognized by the control circuit(s) as corresponding to the second field of view 490-2. For example, a process may be performed to determine which pixels 410*a*1, 410*a*2, 410*b*1, 410*b*2 of the detector array 410 output detection signals responsive to the first and second fields of illumination 390-1 and 390-2, and the reflective optical elements 419 may be aligned such that the and the first and second fields of view 490-1 and 490-2 do not overlap or direct light to the same pixels of the detector 410 (e.g., the first and second fields of view 490-1 and 490-2 may be spaced apart or abutting each other but do not overlap). The control circuit(s) of the lidar system may thereby calculate the respective distances, positions, and/or directions of respective targets relative to the orientation of the lidar system based on the association between the portions of the detector array 410 and the respective fields of view 490-1, 490-2** imaged thereby.

Two or more of the multiple fields of illumination 390-1, 390-2 provided by the lidar emitter **300*a*, 300*b* in combination with one or more reflective optical elements 319 as described herein may be non-overlapping or partially overlapping. Likewise, two or more of the multiple fields of detection 490-1, 490-2 provided by the lidar detector 400*a*, 400*b* in combination with one or more reflective optical elements 419 as described herein may be non-overlapping or partially overlapping. The one or more reflective optical elements 319, 419 may be arranged such that the respective fields of illumination 390-1, 390-2 and the respective fields of view 490-1, 490-2 correspond to one another, that is, to provide spatial registration between the lidar emitter 300*a*, 300*b* and the lidar detector 400*a*, 400*b*. For example, the same or common optical element(s) 319/419 used to reflect the optical signals 330 from the emitter 315 into the fields of illumination 390-1 and 390-2 may be used to direct the reflected optical signals 430 from the fields of view 490-1 and 490-2 to the detector 410**.

In some embodiments, the lidar system may include an apparatus that is configured to provide optical alignment or spatial registration of the detector 110, 410 and emitter 115, 315 components over a range of operating conditions, including varying temperatures. For example, an active alignment system may be configured to align the respective fields of illumination 390-1, 390-2 with the corresponding fields of detection 490-1, 490-2 in a calibration process. Additionally or alternatively, a mechanical apparatus may be configured such that the various elements (reflector 119, 319, 419, emitter 115, 315, and/or detector 110, 410) are aligned when assembled based on the design of the apparatus. In some embodiments, a hybrid optical alignment system may be used, where a mechanical apparatus is used for gross alignment and screws are used for fine active alignment, with an epoxy fixing the final position of the respective elements.

In some embodiments, the reflective optical elements 119, 319, 419 are planar, for example, to preserve the beam shape of the optical signal emission from the lidar emitter 115, 315, once the optical signals have been reflected and to reduce or minimize optical distortions. In some embodiments, the reflective optical elements 119, 319, 419 are non-planar, for example, to concentrate the optical power emitted from the lidar emitter 115, 315 and collected in specific angular regions or sub-regions of the field of view.

In some embodiments, the horizontal component of the primary field of illumination 390 or field of view 490 is segmented, rather than (or in addition to) the vertical component of the field of illumination 390 or field of view 490, or vice versa. In some embodiments, more than one reflective optical element 119, 319, 419 is used to create a segmented field of illumination and/or field of view in multiple directions or dimensions (e.g., both horizontal and vertical).

In some embodiments, the lidar emitter is configured to illuminate multiple different (e.g., all) fields of illumination at once or substantially simultaneously.

In some embodiments, the lidar emitter is configured to illuminate one or more segments of the field of illumination sequentially, e.g., so as to sequentially illuminate the first field of illumination 390-1 and the second field of illumination 390-2. In some embodiments, the lidar detector/receiver electronics is configured to image the corresponding segments of the field of detection sequentially, e.g., so as to sequentially image the first field of view 490-1 and the second field of view 490-2 synchronously with the sequential illumination of the first and second fields of illumination 390-1 and 390-2 by the lidar emitter. Such operations for synchronously operating lidar emitters and lidar detectors are described, for example, in International Patent Application No. PCT/US2020/53444 to Al Abbas et al., the disclosure of which is incorporated by reference herein.

In some embodiments, the lidar emitter is configured to illuminate the whole field of view (or portions thereof) with sequential power stepping or scanning/beam steering, as described for example in U.S. Patent Application Publication No. 2020/0249318 to Henderson et. al, and U.S. Patent Application Publication No. 2018/0301875 to Burroughs et al., the disclosures of which are incorporated by reference herein.

In some embodiments, the reflective optical elements 119, 319, 419 are arranged such that the respective fields of view collectively cover a wide angular range, for example up to 360 degrees relative to a direction of the lidar system.

Lidar systems and arrays described herein may be applied to ADAS (Advanced Driver Assistance Systems), autonomous vehicles, UAVs (unmanned aerial vehicles), industrial automation, robotics, biometrics, modeling, augmented and virtual reality, 3D mapping, and security. In some embodiments, the emitter elements of the emitter array may be VCSELs. In some embodiments, the emitter array may include a non-native (e.g., curved or flexible) substrate having thousands of discrete emitter elements electrically connected in series and/or parallel thereon, with the driver circuit implemented by driver transistors integrated on the non-native substrate adjacent respective rows and/or columns of the emitter array, as described for example in U.S. Patent Application Publication No. 2018/0301872 to Burroughs et al., the disclosure of which is incorporated by reference herein.

A light receiver or detector described herein may include one or more optical elements that are configured to image approximately the same field of view as that of the emitter array onto a detector array (e.g., an array of SPADs, or an array of photon-mixing devices for indirect time-of-flight measurement), similar to those described in U.S. Patent Application Publication No. 2019/0250257 to Finkelstein et al., the disclosure of which is incorporated by reference herein in its entirety.

Various embodiments have been described herein with reference to the accompanying drawings in which example embodiments are shown. These embodiments may, however, be embodied in different forms and should not be construed as limited to the embodiments set forth herein. Rather, these embodiments are provided so that this disclosure is thorough and complete and fully conveys the inventive concept to those skilled in the art. Various modifications to the example embodiments and the generic principles and features described herein will be readily apparent. In the drawings, the sizes and relative sizes of layers and regions are not shown to scale, and in some instances may be exaggerated for clarity.

The example embodiments are mainly described in terms of particular methods and devices provided in particular implementations. However, the methods and devices may operate effectively in other implementations. Phrases such as "example embodiment", "one embodiment" and "another embodiment" may refer to the same or different embodiments as well as to multiple embodiments. The embodiments will be described with respect to systems and/or devices having certain components. However, the systems and/or devices may include fewer or additional components than those shown, and variations in the arrangement and type of the components may be made without departing from the scope of the inventive concepts.

The example embodiments will also be described in the context of particular methods having certain steps or operations. However, the methods and devices may operate effectively for other methods having different and/or additional steps/operations and steps/operations in different orders that are not inconsistent with the example embodiments. Thus, the present inventive concepts are not intended to be limited to the embodiments shown, but are to be accorded the widest scope consistent with the principles and features described herein.

It will be understood that when an element is referred to or illustrated as being "on," "connected," or "coupled" to another element, it can be directly on, connected, or coupled to the other element, or intervening elements may be present. In contrast, when an element is referred to as being "directly on," "directly connected," or "directly coupled" to another element, there are no intervening elements present.

It will also be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "include," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, the regions illustrated in the figures are schematic in nature and their shapes are not intended to illustrate the actual shape of a region of a device and are not intended to limit the scope of the invention.

Unless otherwise defined, all terms used in disclosing embodiments of the invention, including technical and scientific terms, have the same meaning as commonly understood by one of ordinary skill in the art to which this invention belongs, and are not necessarily limited to the specific definitions known at the time of the present invention being described. Accordingly, these terms can include equivalent terms that are created after such time. It will be further understood that terms, such as those defined in commonly used dictionaries, should be interpreted as having a meaning that is consistent with their meaning in the present specification and in the context of the relevant art and will not be interpreted in an idealized or overly formal sense unless expressly so defined herein. All publications, patent applications, patents, and other references mentioned herein are incorporated by reference in their entireties.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments of the present invention described herein, and of the manner and process of making and using them, and shall support claims to any such combination or subcombination.

Although the invention has been described herein with reference to various embodiments, it will be appreciated that further variations and modifications may be made within the scope and spirit of the principles of the invention. Although specific terms are employed, they are used in a generic and descriptive sense only and not for purposes of limitation, the scope of the present invention being set forth in the following claims.

That which is claimed:

1. A Light Detection and Ranging (LIDAR) system, comprising:

a flash-type lidar emitter comprising one or more emitter elements configured to emit optical signals as a broad-area illumination pulse defining a primary field of illumination comprising a first segment and a second segment;

a lidar detector comprising an array of detector pixels configured to detect light corresponding to the optical signals, wherein the array of detector pixels includes first and second subsets of detector pixels arranged in distinct regions of the array, wherein the first subset of detector pixels is dedicated to detecting light from the first segment of the primary field of illumination; and one or more stationary reflective optical elements, positioned within the primary field of illumination, and arranged such that:

at least one of the optical elements is configured to reflect a first subset of the optical signals emitted from the flash-type lidar emitter away from the second segment of the primary field of illumination and redirect the first subset of optical signals into a secondary field of illumination that is spatially distinct from and non-overlapping with the primary field of illumination, while simultaneously permitting a second subset of the optical signals to illuminate the first segment of the primary field of illumination; and at least one of the optical elements is configured to simultaneously reflect light from a secondary field of view, corresponding to the secondary field of illumination and spatially distinct and non-overlapping with the primary field of detection, toward the second subset of detector pixels;

wherein the LIDAR system is configured such that both the first segment of the primary field of illumination and the secondary field of illumination are concurrently illuminated by the broad area illumination pulse.

2. A Light Detection and Ranging (LIDAR) system, comprising:

a lidar emitter comprising an array of emitter elements configured to emit optical signals to concurrently illuminate first and second fields of illumination that are spatially distinct and non-overlapping;

a lidar detector comprising an array of detector pixels, wherein the array includes first and second subsets of detector pixels arranged in distinct regions of the array; and one or more stationary reflective optical elements mounted in fixed positions relative to the lidar detector and arranged such that reflected light from a target in the second field of illumination is reflected by the at least one stationary reflective optical element toward the second subset of detector pixels, and reflected light from a target in the first field of illumination reaches the first subset of detector pixels without being reflected by the one or more stationary reflective optical elements;

wherein the first and second subsets of detector pixels are configured to concurrently detect reflected light from their respective fields when the lidar emitter concurrently illuminates the first and second fields of illumination.

3. The LIDAR system of claim 2, wherein the one or more stationary reflective optical elements are arranged to obstruct a portion of the optical signals to define the second field of illumination.

4. The LIDAR system of claim 3, wherein the lidar emitter is configured to be mounted facing a first direction corresponding to the first field of illumination, and wherein the second field of illumination is in a second direction that differs from the first direction by at least about 60 degrees.

5. The LIDAR system of claim 4, wherein the array of emitter elements comprises first and second subsets of emitter elements, the first subset of emitter elements are configured to provide the first field of illumination, and the second subset of emitter elements and the one or more stationary reflective optical elements are configured to provide the second field of illumination.

6. The LIDAR system of claim 5, further comprising:

an emitter control circuit coupled to the lidar emitter and configured to activate the first and second subsets of emitter elements to concurrently provide the first and second fields of illumination, respectively, with different power levels.

7. The LIDAR system of claim 4, wherein the first field of illumination and the second field of illumination collectively illuminate an angular range of up to 360 degrees relative to the first direction.

8. A Light Detection and Ranging (LIDAR) system, comprising:

a lidar emitter comprising an array of emitter elements configured to emit optical signals as a broad-area illumination pulse toward a primary field of illumination comprising a first segment and a second segment;

a lidar detector comprising an array of detector pixels configured to detect light corresponding to the optical signals, wherein the array of detector pixels includes first and second subsets of detector pixels and the first subset of detector pixels is dedicated to detecting light from the first segment of the primary field of illumination; and one or more stationary reflective optical elements mounted in fixed positions relative to the lidar emitter and lidar detector and arranged to obstruct and redirect a first subset of the optical signals from a first region of the emitter array away from the second segment of the primary field of illumination into a secondary field of illumination that is non-overlapping with the primary field of illumination, while allowing a second subset of the optical signals from a second region of the emitter array to illuminate the first segment of the primary field of illumination.

9. The LIDAR system of claim 8, wherein the lidar detector is configured to detect light over a primary field of detection comprising a first field of view and one or more additional fields of view, and wherein the one or more reflective optical elements are arranged to obstruct the one or more additional fields of view, optionally without altering the first field of view.

10. The LIDAR system of claim 9, wherein the lidar detector is configured to be mounted facing a first direction, and wherein at least one of the one or more additional fields of view comprises a second field of view in a second direction that differs from the first direction by about 60 degrees or more, by about 90 degrees or more, by about 120 degrees or more, or by about 180 degrees or more.

11. The LIDAR system of claim 10, wherein the first subset of detector pixels is configured to image the first field of view, and the second subset of detector pixels and the one or more reflective optical elements are configured to image the second field of view.

12. The LIDAR system of claim 11, further comprising:

a detector control circuit coupled to the lidar detector and configured to activate the first and second subsets of detector pixels to image the first and second fields of view, respectively, sequentially and/or with different sensitivity levels, optionally synchronously or in coordination with activation of emitter elements in the first and second regions of the emitter array to sequentially provide first and second fields of illumination, respectively.

13. The LIDAR system of claim 11, further comprising:

at least one control circuit coupled to the lidar detector, wherein the at least one control circuit is configured to:

receive respective detection signals output from the first and second subsets of detector pixels;

calculate a distance, position, and/or direction of a first target in the first field of view relative to the first direction responsive to the respective detection signals output from the first subset of detector pixels; and calculate a distance, position, and/or direction of a second target in the second field of view relative to the first direction responsive to the respective detection signals output from the second subset of detector pixels.

14. The LIDAR system of claim 10, wherein the first field of view and the second field of view collectively image an angular range of up to 360 degrees relative to the first direction.

15. The LIDAR system of claim 1, wherein the one or more reflective optical elements comprise a shared element that is configured to reflect the one or more subsets of the optical signals into the secondary field of illumination and to reflect the light from secondary field of view toward the lidar detector.

16. The LIDAR system of claim 1, wherein the one or more reflective optical elements comprises one or more mirrors.

17. The LIDAR system of claim 1, wherein the one or more reflective optical elements comprises one or more reflective surfaces of a housing comprising the lidar emitter and/or the lidar detector.

18. The LIDAR system of claim 1, wherein the first segment of the primary field of illumination is directed in a first direction, and wherein the first direction is a forward direction of travel of an autonomous vehicle.

19. The LIDAR system of claim 18, further comprising:

at least one control circuit coupled to the lidar emitter and/or the lidar detector, wherein the at least one control circuit is configured to:

operate the lidar emitter and/or the lidar detector to provide the first segment of the primary field of illumination and/or detect light from the first segment responsive to detecting a first vehicle operational mode for travel in the forward direction; and operate the lidar emitter and/or the lidar detector to provide the secondary field of illumination and/or the secondary field view responsive to detecting a second vehicle operational mode for travel in a reverse direction of travel.

20. The LIDAR system of claim 1, wherein the one or more reflective optical elements are arranged to provide the first segment of the primary field of illumination and the secondary field of illumination and/or the corresponding fields of view in two or more dimensions.

21. A Light Detection and Ranging (LIDAR) system, comprising:

a housing configured for fixed mounting to a vehicle;

a flash lidar emitter comprising an array of emitter elements and a lidar detector comprising an array of detector pixels disposed within the housing;

a shared stationary reflective optical element fixed within the housing and positioned to intersect a portion of a primary field of illumination of the emitter array and a portion of a primary field of detection of the detector array; and a control circuit operably coupled to the vehicle, the emitter array, and the detector array, the control circuit configured to:

detect a vehicle operational mode corresponding to a forward direction of travel or a reverse direction of travel;

responsive to detecting the forward direction of travel, activate a first segment of the emitter array to provide illumination in a first direction relative to the housing, and activate a first segment of the detector array to detect reflected light from the first direction; and responsive to detecting the reverse direction of travel, activate a second segment of the emitter array such that optical signals from the second segment are redirected by the shared stationary reflective element into a second direction that differs from the first direction by at least 90 degrees, and activate a second segment of the detector array to detect reflected light from the second direction that is redirected to the second segment of the detector array by the shared stationary reflective element.

* * * * *